July 21, 1953   L. H. BARGHAUSEN   2,645,779
ARTIFICIAL LIMB KNEE STRUCTURE
Filed June 25, 1951   2 Sheets-Sheet 1
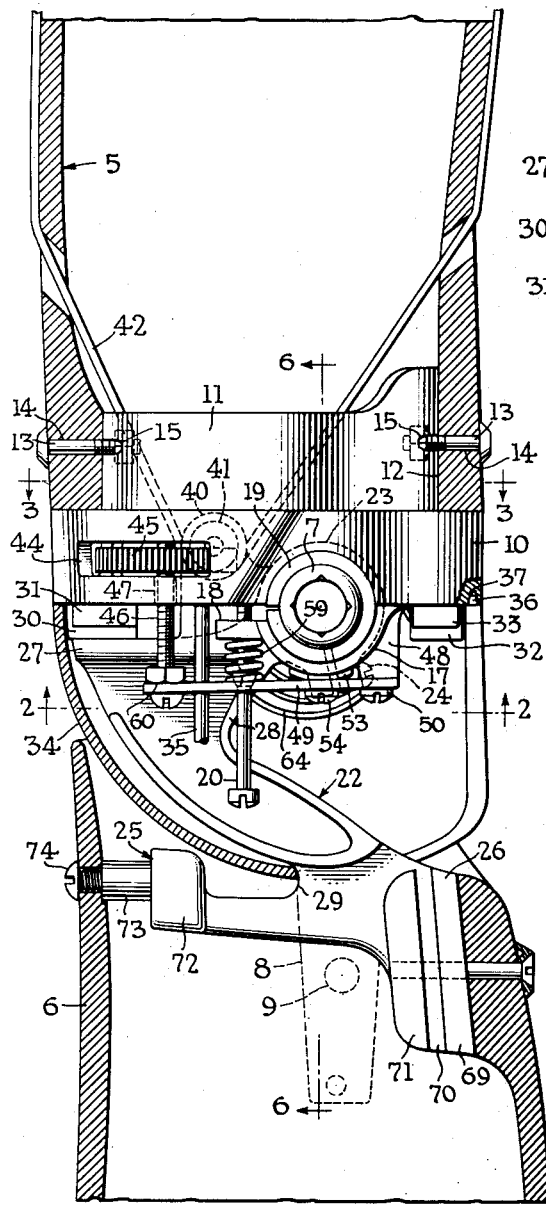
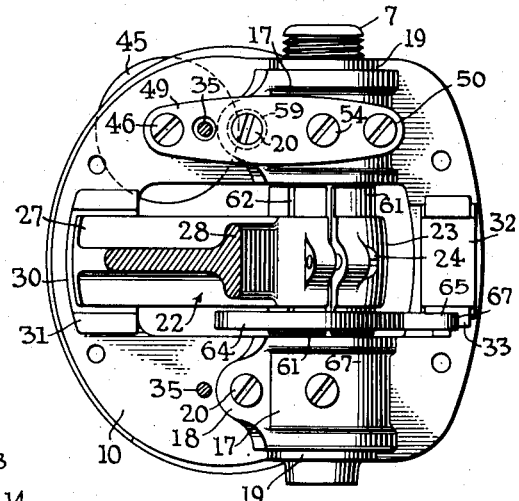
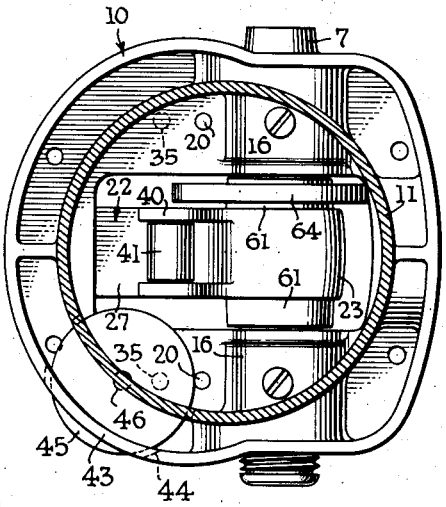
INVENTOR.
Louis H. Barghausen
BY
Attorneys

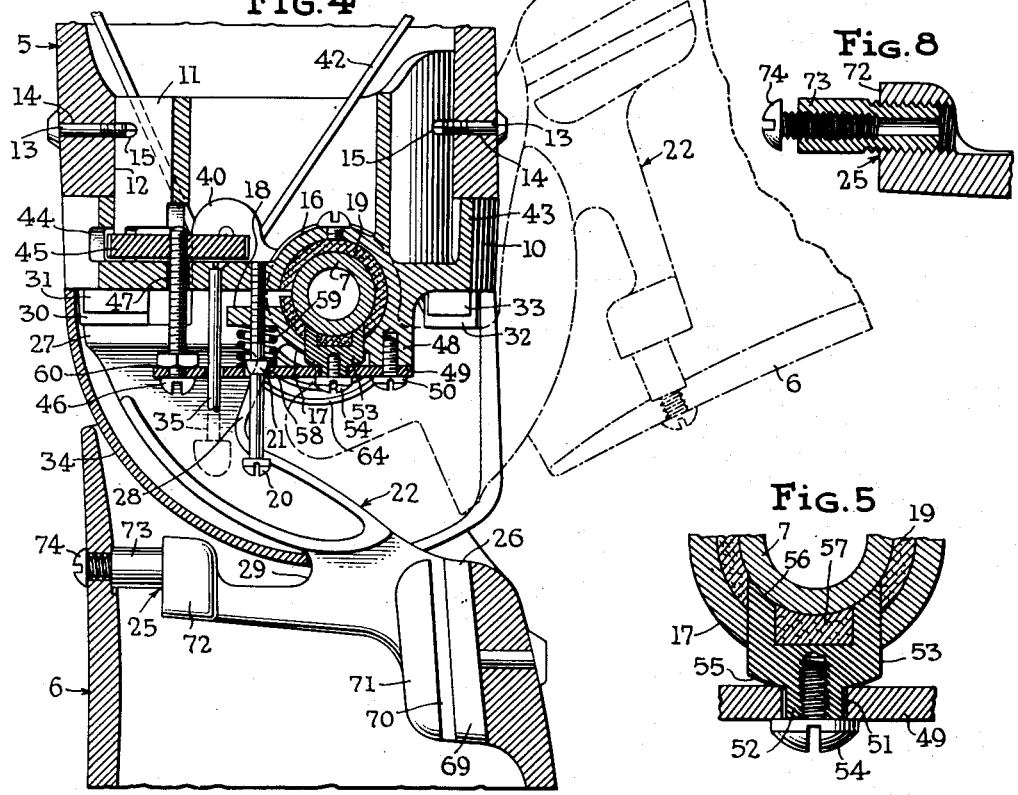

Patented July 21, 1953

2,645,779

UNITED STATES PATENT OFFICE 2,645,779

ARTIFICIAL LIMB KNEE STRUCTURE

Louis H. Barghausen, Pittsburgh, Pa.

Application June 25, 1951, Serial No. 233,434

13 Claims. (Cl. 3—28)

The invention relates generally to artificial limbs and primarily seeks to provide a novel universal or standardized knee structure by which the thigh and shank sections of limbs of a range of sizes may be articulated and in which are incorporated novel means for quickly and conveniently adjusting the friction resisting swinging movement of the shank section on the thigh section so as to suit the gait of the particular wearer of the limb, or to take care of varying demands due to changes in climatic conditions or variations in temperature within or without doors, and also kicker spring means for imparting just the right amount of forward swinging movement to the shank section as the limb disengages the ground during each step in the walking process.

I am aware that friction adjustment devices and also kicker spring means have been provided heretofore, but all such devices of which I am aware have not met with the public approval to be expected thereof for various reasons. For example, such devices have been so complicated and difficult of adjustment as not to be practical. Some such devices have provided impractical adjustments which were not foolproof and resulted in improper and unsatisfactory usages. None of such devices were of such nature as to enable adjustment of the friction and kicker spring strength in relative combination so as to provide for the necessary adjustments in required accuracy and certainty, nor were such prior known friction and spring devices ever provided in novel combination mounting on a universal knee plate permitting accurate fitting and alignment between stump socket and foot. It is a purpose of the present invention to provide an improved knee structure wherein all of the above mentioned deficiencies are avoided.

An object of the invention is to provide a knee structure of the character stated which is attachable to and between the thigh and shank sections to provide an articulated joint therefor, said structure including a knee plate to which the friction and spring means are attached and which includes a cylindrical extension receivable and readily adjustable in a bore in the thigh section, adjustment of said plate on the thigh section serving to greatly facilitate accurate lining up of the foot and shank section with the thigh section and the stump socket therein so as to assure perfect fitting of the limb as a whole and the proper projection of said foot.

Another object of the invention is to provide a knee structure including a knee plate of the character stated wherein the adjustable friction means is incorporated in one of the knee bolt bearings provided on said plate, a knee check being included having laterally extending hub means thereon for receiving and providing attachment to the knee bolt and forming a mounting for a kicker spring convolutely wound about said hub means.

Another object of the invention is to provide a knee structure including a knee check and knee plate of the character stated and wherein the friction adjustment means includes a knurled head projecting through an opening in the knee plate structure for adjustment from without, said plate being formed for right or left mountings and said check including hub means projecting endwise in each direction for providing an adjustable mounting for the kicker spring on the right or left side accordingly as the check is employed with a right or left knee plate.

Another object of the invention is to provide a knee structure of the character stated wherein the knee check has provision for attachment at front and rear of the shank section through attachment means providing for the mounting of the knee check on shank sections of different sizes.

Another object of the invention is to provide a knee structure in which the knee check includes a pad portion for attachment to a large shank section and a pad portion adaptable for attachment to a smaller pad section upon removal of the first mentioned pad portion.

Another object of the invention is to provide a knee structure of the character stated including a knee section having a pad projecting toward the front of a shank section, and a screw member threadably mounted on said pad for projection therefrom a greater or lesser distance for attachment to a small or large shank section, screw means also being included for securing a shank section wall portion to said adjustable screw member.

With the above and other objects in view that will hereinafter appear, the nature of the invention will be more clearly understood by reference to the following detailed description, the appended claims and the several views illustrated in the accompanying drawings:

In the drawings:

Figure 1 is a detail vertical cross section illustrating portions of a thigh section and a shank section articulated by the knee structure embodying the invention, the knee plate and knee check of the knee structure being shown in side elevation.

Figure 2 is a horizontal section taken on the line 2—2 on Figure 1.

Figure 3 is a horizontal section taken on the line 3—3 on Figure 1.

Figure 4 is a view similar to Figure 1, the knee plate and the friction adjusting devices being shown in section, the shank section being in its forward stop position in full lines and in its rearward stop position in dot and dash lines.

Figure 5 is an enlarged detail section illustrating the brake shoe and its attachment to the presser bar.

Figure 6 is a vertical cross section taken on the line 6—6 on Figure 1.

Figure 7 is a detail side elevation illustrating the knee check and the convolute kicker spring mounted thereon.

Figure 8 is an enlarged framentary sectional view illustrating the adjustable means for attaching the front portion of the knee check to a limb shank section.

The knee structure embodying the invention and disclosed herein is shown as incorporated in an artificial limb including the usual thigh section 5 and shank section 6 pivotally connected by a knee bolt 7 which passes through the usual side arms 8 which are riveted or otherwise secured as at 9 to the shank section. The knee structure includes a knee plate 10, the lower face of which lies in the same horizontal plane with the axis of the knee bolt, and the plate includes an upstanding collar or flange 11 which is circular in horizontal cross section and adjustably fits within a circular bore 12 formed in the lower end of the thigh section 5. It will be readily apparent that during the fitting of the limb the knee structure and the attached shank section may be turned axially within the thigh section bore 12 in order to adjust the direction of projection of the attached foot and properly line up on the limb, and the selected adjustment may be secured by use of the screw bolts 13 which pass through holes 14 in the thigh section and elongated slots 15 formed in the knee plate collar or flange 11.

The knee plate 10 also includes two half cylindrical depressions or recesses 16 which are opposed by cast extension portions 17 terminating in adjuster ears 18 which are spaced from the plate in the manner clearly illustrated in Figures 1, 2 and 4 of the drawings. The depressions 16 and the extension portions 17 form bearings in which to receive split bearing sleeves 19 which may be formed of fiber or comparable acceptable bearing material in which to receive the knee bolt 7. A longitudinal screw 20 extends through a bore in each adjuster ear 18 and into a receiving tap in the plate 10, and on each said screw is included an adjuster head 21 which may be engaged with the respective ear 17 so that upon adjustment of the screw in one direction or the other the respective bearing sleeve 19 may be contracted or permitted to expand so as to vary the friction applied to the knee bolt and effective to resist free turning thereof within said sleeves.

The central portion of the knee plate is cut away in the manner clearly illustrated in Figures 2, 3 and 6 of the drawings in order to accommodate the knee check which is generally designated 22, and said knee check includes a hub 23 which is split and securely clamped by a screw 24 about the knee bolt 7. Thus it will be apparent that the shank section, the knee check 22 and the knee bolt 7 swing in unison. The knee check is secured at the front in the manner generally indicated at 25 within the shank section 6, and also at the rear in the manner generally indicated at 26 within said shank section. This knee check is shaped in the manner clearly illustrated in Figures 1, 4, 6 and 7 of the drawings to provide a front check stop 27, a rear check stop 28 and a cap clearance 29. The front check stop 27 is engageable with a bumper 30 mounted as at 31 on the knee plate 10, and the rear check stop 28 is engageable with a bumper 32 mounted as at 33 on said knee plate. Engagement of the front check stop 27 with the front bumper 30 limits swinging movement of the shank section in the forward direction at the position illustrated in Figures 1 and 4, and engagement of the rear check stop 28 with the rear bumper 32 limits swinging movement of the shank section in the rearward direction in the manner indicated in dot and dash lines in Figure 4.

A knee cap 34 is secured to the knee plate 10 by screws 35, and aligning tapered dowel pins 36 project from the upper edge of the knee plate and are engageable in aligning recesses 37 provided in the knee plate 10. The engagement of the tapered pins 36 in the recesses 37 serves to maintain the meeting edges of the knee plate and the knee cap in alignment, and should there be any springing of the knee cap during casting or hard usage, said aligning pins and recesses will serve to draw the parts into proper cooperative relation and alignment. It will be apparent by reference to Figure 6 that the knee cap also includes apertures 39 through which the tension adjuster screws 20 may be manipulated.

The center opening in the knee plate 10 also clears the crank extension 40 provided on the knee check 22, said extension being equipped with a roller 41 under which passes the bight of a control strap 42 depending from an optional belt or other support (not shown). It has been known in the art that the connection of a strap 42 with a crank roller 41, as optionally shown herein, enables a wearer of a limb to exert an upward pull on the crank extension which is effective to throw the shank section forward during movement of the shank section, and in conjunction with proper control of the friction as herein taught, a wearer is enabled to walk with the artificial limb with ease and comfort. Novel means are disclosed herein for adjusting the friction conveniently and from the outside of the knee structure, without the necessity of using special tools. Moreover, there is provided in combination with this adjusting means effective to vary the frictional resistance to suit the gait of the particular wearer of the limb, or take care of varying demands due to changes in climatic conditions or variations in temperature within or without doors, novel kicker spring means for imparting just the right amount of forward swinging movement to the shank section as the limb disengages the ground during each step in the walking process. The novel combination, structure and arrangement of these parts will now be described. This kicker spring means can be used without supporting means such as the strap 42, as when used on a limb equipped with a suction socket, or supplementary supporting devices may be optionally employed, as shown.

It will be noted by reference to Figures 1, 3, 4 and 6 of the drawings that the knee plate 10 includes an upstanding outer abutment flange 43, and in this flange, and in the collar or flange 11, a slotway 44 is provided in which an adjuster wheel 45 is rotatably confined with its periphery projecting only slightly through the outside of the slotway in the manner clearly illustrated, especially in Figures 2 and 3. The captive wheel 45 is threaded on an adjuster screw 46 which passes through a smooth bore 47 in the knee plate 10 in line with one of the laterally disposed friction bearings. At the side at which the adjuster wheel 45 is mounted, the knee plate is equipped with an anchor lug 48 to which a heavy but flexible presser bar 49 is anchored at one end as at 50. The adjustably anchored presser bar is apertured as at 51 to receive a reduced hub extension 52 of a brake shoe 53, preferably formed of bronze. The reduced hub extension 52 is floatably secured to the presser bar 49 and within the aperture 51 by means of a screw 54, and the outer face of the brake shoe 53 which opposes the presser bar 49 preferably is curved as at 55. It will be apparent by reference to Figures 4 and 5 of the drawings that the inner face of the brake shoe is curved, as at 56, on the same radius as the outer surface of the knee bolt 7 so as to lie snugly thereagainst for braking contact therewith, and said face is recessed to receive a filler 57, preferably of leather or other suitable non-metallic material impregnated with graphite. The filler may act as a lubricant alone or as a lubricant and a grip surface, the idea being to provide just the right amount of friction and yet assure against galling. It is to be understood, however, that the main braking action or friction application is provided by the metal to metal contact between the bronze shoe surface 56 and the knee bolt 7.

It will be apparent by reference to Figure 4 that the presser bar 49 is provided with an aperture 58 for clearing the adjuster screw 20 and the head 21 thereof associated with the respective bearing ear extension 18, and a compression spring 59 surrounds said screw between the adjacent ear 18 and the opposing face of the bar 49 and serves to constantly urge the bar in a direction for displacing the brake shoe 53 from its friction controlling contact with the knee bolt 7. The adjuster screw 46 to which longitudinal movement is imparted by rotation of the finger wheel 45 is anchored to the free end of the presser bar 49 as at 60.

It will be apparent that by adjusting the screws 20 the amount of friction applied by the bearing sleeves 19 to the knee bolt 7 may be varied at will. This applied friction is supplemented by the friction control provided by the brake shoe 53 and of the controlling finger wheel 45. It will be readily understood that the friction requirements for controlling the swing of the shank section in accordance with the gait of a particular wearer or demands of varying climatic conditions will demand that the changes in the applied friction can be made when necessary and with convenience. The improved finger wheel control 45 serves this need and makes it possible for the wearer of the limb to adjust the friction to a nicety by finger engagement with the periphery of the wheel 45 effective to increase or diminish friction pressure application of the brake shoe 53 against the knee bolt.

It is to be noted that the knee check hub 23 has a reduced end extension 61 at each end thereof, this being for the purpose of making each check adaptable for use with either a right or a left knee plate. Each of the reduced end extensions 61 of the hub is provided with a plurality of radial slots 62 extending through its free end extremity and adapted for selectively receiving the radially inwardly turned inner end 63 of a convolutely wound flat torsion spring 64. It will be apparent by reference to Figures 6 and 7 of the drawings that the spring is mounted on one of the reduced end extensions 61 of the hub, always the end remote from the side of the knee plate at which the friction adjuster wheel 45 is located.

The kicker spring 64 is provided with an outwardly turned hook 65 at its outer end, said hook being engageable over an anchoring shoulder 66 and in a receiving recess cast directly on the knee plate 10 at one side of the mounting means for the rear check stop bumper 32. The positioning of the spring 64 on the knee check hub and the connection of the inner and outer ends thereof to the check hub extension and the knee plate are such as to cause the spring to constantly tend to swing the knee check and the limb shank forwardly with relation to the knee plate and the limb thigh section to which it is attached. It will be apparent that the potential torsional effort of the spring 64 can be varied by selectively placing the inner end 63 thereof in the selective slots 62, thereby to increase or diminish the amount of energy stored in the spring and constantly tending to swing the limb shank section in the manner stated.

In this particular example disclosure a relatively large limb is shown, and the rear anchor 26 of the check lever takes the form of a selective pad 69 joined by a weakened portion 70 to a second selective pad 71. When the knee structure is mounted in a large limb in the manner illustrated, the pad 69 will be directly secured to the rear wall of the shank section, the pad being used in its initially cast condition for the largest size of the range of shank sizes, and narrowed by the grinding away of more or less of the face portion thereof for slightly smaller sizes. For relatively small sizes of limbs and shank sections, the whole pad 69 may be ground away and the outer face of the second selected pad 71 or so much of said second pad as may be required may be directly secured to the rear wall of the shank section.

The front anchor of the knee check generally designated 25 may comprise a pad 72 having a hollow screw 73 adjustably threaded thereon in position for having its outwardly projected extremity presented for opposition to the front inner wall of the shank section. By adjusting the screw 73, said shank wall opposing end portion can be positioned for properly engaging the inner wall of the shank, and a securing screw 74 passed through an aperture in the front wall of the shank and threaded into the screw 73 may serve to securely anchor the front wall of the limb shank to the forwardly projected portion of the knee section.

The herein described metal knee structure provides marked advantages in the facility with which it can be initially incorporated in the thigh section and adjusted therein to suit the requirements of the particular wearer. It is of marked advantage to provide the efficient checking of the shank movement both in the forward and rearward direction, and the simple finger wheel adjustment 45 which enables the adjustment of the friction applied to the knee bolt by the wearer himself, without the use of special tools and without the necessity of seeking a place of privacy in which to make the manipulation.

The kicker spring 64 functions in combination with the friction adjustment wheel 45 in coordinating just the right amount of friction and shank kicker action. The adjustment of the inner end of the spring 64 in the selective receiving slots 62 provide stages of adjustment of the spring kicker effort, and the stage adjustments of the spring effort are supplemented by the fine increment adjustments of the friction provided by manipulation of the finger wheel 45. By the reason of the provision of these particular friction and kicker spring adjustments, it is a simple matter to adapt each limb with great facility to all demands or use, making it possible to vary friction and spring effort to suit conditions varying not only because of changes in temperature and the like, but also to take care of varying walking conditions.

It will be apparent that the novel knee check structure comprises a spring support, is universal in form so as to be adaptable for use with right or left knee plates, and provides selective abutments for being efficiently secured at front and rear to different sizes of limb shank sections. The particular form and mounting of the spring with its flat convolutions coiled about the specific cylindrical hub extension provides a very efficient spring action without any danger of binding or in any way interfering with relatively moving parts within the knee structure.

It should be apparent also that the whole structure including the knee plate, the pivot bolt, the knee check, the knee cap and the adjuster devices comprises a unit assembly which can be readily adjusted in position in the lower end extremity of the thigh section of the limb. As before stated, when the knee structure is properly attached to the shank section, adjustment of the knee plate on the end of the thigh section and with its cylindrical extension in the thigh section bore will enable the adjustment of the shank section and the attached foot with great facility in properly lining the same up relative to the thigh section and the socket therein. Thus the disclosed knee structure serves not only to provide a highly efficient and readily adjustable friction and spring means, but it also greatly facilitates assembly of limb structures and perfect fitting of limb structure as a whole.

It is preferred that the knee plate 10 be formed of magnesium, and it has been found that by anchoring the outer end of the spring 64 directly on the plate 10 in the manner shown and described, a very compact structure will be provided and all possibility of inadvertent dislodgment of the spring anchor or relative movement of the spring and anchorage parts such as might provide objectionable noise is avoided.

While the example disclosure herein includes the strap bight 42, roller 41 and crank extension 40 which may function in combination with the kicker spring and has a limb supporting means, it is to be understood that the herein disclosed knee structure can be used to great advantage in limbs including suction sockets, in which case the crank extension 40, the roller 41 and the strap 42 could be eliminated and the kicker spring would constitute the sole means for moving the shank section forwardly as the contact with the floor or ground is broken incidental to the making of each step in the process of walking.

While one form of the invention has been shown for purposes of illustration, it is to be clearly understood that various changes in the details of construction and arrangement of parts may be made without departing from the spirit and scope of the invention as defined in the appended claims.

I claim:

1. In an artificial limb, a thigh section, a shank section, and a knee assembly forming a pivotal connection between said sections and comprising a knee plate traversing and conforming in shape to the lower end extremity of the thigh section and having a central opening and an upward cylindrical extension adjustably secured in a bore in said thigh section, a friction bearing on said plate at each side of said opening, a knee bolt passing through and frictionally gripped by said bearings and pivotally connecting the shank section and said plate and thigh section, a knee check lever secured to the shank section and having a hub encircling and secured to the bolt within the knee plate opening, a flat spring convolutely wound about said hub in a plane perpendicular to the axis of the hub and connected at its inner end to said hub and at its outer end to said plate in position for constantly tending to swing the shank section forwardly with relation to the thigh section, means engageable by the check lever for limiting forward swinging movement of the shank section, and means operable from without the knee structure for varying the frictional grip of at least one said bearing on said bolt to vary the resistance to free swinging of the shank section under the urge of said spring.

2. In an artificial limb, a thigh section, a shank section, and a knee assembly forming a pivotal connection between said sections and comprising a knee plate traversing and conforming in shape to the lower end extremity of the thigh section and having a central opening and an upward cylindrical extension adjustably secured in a bore in said thigh section, a friction bearing on said plate at each side of said opening, a knee bolt passing through and frictionally gripped by said bearings and pivotally connecting the shank section and said plate and thigh section, a knee check lever secured to the shank section and having a hub encircling and secured to the bolt within the knee plate opening, a flat spring convolutely wound about said hub in a plane perpendicular to the axis of the hub and connected at its inner end to said hub and at its outer end to said plate in position for constantly tending to swing the shank section forwardly with relation to the thigh section, means engageable by the check lever for limiting forward swinging movement of the shank section, and means adjustably mounting the inner end of said spring on said hub through a plurality of predetermined step distances for varying the shank swinging force to be exerted by said spring.

3. In an artificial limb, a thigh section, a shank section, and a knee assembly forming a pivotal connection between said sections and comprising a knee plate traversing and conforming in shape to the lower end extremity of the thigh section and having a central opening and an upward cylindrical extension adjustably secured in a bore in said thigh section, a friction bearing on said plate at each side of said opening, a knee bolt passing through and frictionally gripped by said bearings and pivotally connecting the shank section and said plate and thigh section, a knee check lever secured to the shank section and having a hub encircling and secured to the bolt within the knee plate opening, a flat spring convolutely wound about said hub in a plane perpendicular to the axis of the hub and connected at its inner end to said hub and at its outer end to said plate in position for constantly tending to swing the shank section forwardly with relation to the thigh section, means engageable by the check lever for limiting forward swinging movement of the shank section, means operable from without the knee structure for varying the frictional grip of at least one said bearing on said bolt to vary the resistance to free swinging of the shank section under the urge of said spring, and means adjustably mounting the inner end of said spring on said hub for varying the shank swinging force to be exerted by said spring.

4. In an artificial limb, a thigh section, a shank section, and a knee assembly forming a pivotal connection between said sections and comprising a knee plate traversing and conforming in shape to the lower end extremity of the thigh section and having a central opening and an upward cylindrical extension adjustably secured in a bore in said thigh section, a friction bearing on said plate at each side of said opening, a knee bolt passing through and frictionally gripped by said bearings and pivotally connecting the shank section and said plate and thigh section, a knee check lever secured to the shank section and having a hub encircling and secured to the bolt within the knee plate opening, a flat spring convolutely wound about said hub in a plane perpendicular to the axis of the hub and connected at its inner end to said hub and at its outer end to said plate in position for constantly tending to swing the shank section forwardly with relation to the thigh section, means engageable by the check lever for limiting forward swinging movement of the shank section, and means including a finger wheel projecting slightly beyond the periphery of the knee plate at one side toward the front thereof for varying the frictional grip of the bearing at said one side on the knee bolt to vary the resistance to free swinging of the shank section under the urge of the spring, said spring being mounted at the end of the knee check lever hub remote from the position of said wheel.

5. In an artificial limb, a thigh section, a shank section, and a knee assembly forming a pivotal connection between said sections and comprising a knee plate traversing and conforming in shape to the lower end extremity of the thigh section and having a central opening and an upward cylindrical extension adjustably secured in a bore in said thigh section, a friction bearing on said plate at each side of said opening, a knee bolt passing through and frictionally gripped by said bearings and pivotally connecting the shank section and said plate and thigh section, a knee check lever secured to the shank section and having a hub encircling and secured to the bolt within the knee plate opening, a flat spring convolutely wound about said hub in a plane perpendicular to the axis of the hub and connected at its inner end to said hub and at its outer end to said plate in position for constantly tending to swing the shank section forwardly with relation to the thigh section, means engageable by the check lever for limiting forward swinging movement of the shank section, and means including a finger wheel projecting slightly beyond the periphery of the knee plate at one side toward the front thereof for varying the frictional grip of the bearing at said one side on the knee bolt to vary the resistance to free swinging of the shank section under the urge of the spring, the plate thus constituting a left or right plate according to the side on which the wheel is mounted, and said spring being mounted on one end or the other of said hub accordingly as the knee check lever is assembled with a right or left knee plate.

6. In artificial limb structure, the combination of a knee plate shaped to traverse and conform in peripheral outline to the lower end extremity of a thigh section and having an upstanding cylindrical extension adapted to be adjustably secured in a bore in a thigh section, said plate also having a center opening therein and two knee bolt receiving friction bearings flanking said opening, a knee bolt extending through and frictionally gripped by said bearings, a knee check lever having a hub encircling and secured to the bolt within the plate opening, and a flat spring convolutely wound about said hub in a plane perpendicular to the axis of the hub and connected at its inner end to said hub and at its outer end to said plate in position for constantly tending to swing the check lever forwardly with relation to the knee plate.

7. In artificial limb structure, the combination of a knee plate shaped to traverse and conform in peripheral outline to the lower end extremity of a thigh section and having an upstanding cylindrical extension adapted to be adjustably secured in a bore in a thigh section, said plate also having a center opening therein and two knee bolt receiving friction bearings flanking said opening, a knee bolt extending through and frictionally gripped by said bearings, a knee check lever having a hub encircling and secured to the bolt within the plate opening, a flat spring convolutely wound about said hub in a plane perpendicular to the axis of the hub and connected at its inner end to said hub and at its outer end to said plate in position for constantly tending to swing the check lever forwardly with relation to the thigh section, and means including a finger wheel projecting slightly beyond the periphery of the knee plate at one side toward the front thereof for varying the frictional grip of the bearing at said one side on the knee bolt to vary the resistance to free swinging of the knee check lever under the urge of the spring, said spring being mounted at the end of the knee check lever hub remote from the position of said wheel.

8. In artificial limb structure, the combination of a knee plate shaped to traverse and conform in peripheral outline to the lower end extremity of a thigh section and having an upstanding cylindrical extension adapted to be adjustably secured in a bore in a thigh section, said plate also having a center opening therein and two knee bolt receiving friction bearings flanking said opening, a knee bolt extending through and frictionally gripped by said bearings, a knee check lever having a hub encircling and secured to the bolt within the plate opening, a flat spring convolutely wound about said hub in a plane perpendicular to the axis of the hub and connected at its inner end to said hub and at its outer end to said plate in position for constantly tending to swing the check lever forwardly with relation to the thigh section, and means including a finger wheel projecting slightly beyond the periphery of the knee plate at one side toward the front thereof for varying the frictional grip of the bearing at said one side on the knee bolt to vary the resistance to free swinging of the knee check lever under the urge of the spring, the plate thus constituting a left or right plate according to the side on which the wheel is mounted, and said spring being mounted on one end or the other of said hub accordingly as the knee check lever is assembled with a right or left knee plate.

9. A knee check for use in artificial limbs comprising a lever body, swing check abutment means projecting forwardly from said body, a hub carried by said lever body and adapted to surround a knee bolt, and a securing arm depending from said lever body and disposed to extend in a front to rear direction across a limb shank section and provide means for attaching the check to said shank section, said arm having an attaching pad at its front end, and an attaching pad at its rear end, said front pad having a threaded tap therein, a hollow tapped screw threadably mounted in the pad tap for adjustment a greater or lesser distance forwardly of the front pad as a shank wall abutment, and a screw threadable in the hollow screw tap for securing a shank wall to said abutment forming hollow screw.

10. A knee check for use in artificial limbs comprising a lever body, swing check abutment means projecting forwardly from said body, a hub carried by said lever body and adapted to surround a knee bolt, and means for securing the lever in a limb shank section, said hub having a reduced cylindrical extension at one end adapted for receiving a kicker spring, and a plurality of radial slots extending through said end to provide selective anchors for an end portion of said spring.

11. A knee check for use in artificial limbs comprising a lever body, swing check abutment means projecting forwardly from said body, a hub carried by said lever body and adapted to surround a knee bolt, and means for securing the lever in a limb shank section, said hub having a reduced cylindrical extension at each end thereof, said reduced end extensions being adapted selectively for receiving a kicker spring and each thereof being provided with a plurality of radial slots extending through its free end extremity to provide selective anchors for an end portion of said spring.

12. In an artificial limb, a thigh section, a shank section, and a knee structure forming a pivotal connection between said sections and including a knee plate traversing and conforming in shape to the lower end extremity of the thigh section and having a central opening and an upward cylindrical extension adjustably secured in a bore in said thigh section, a friction bearing on said plate at each side of said opening, a knee bolt passing through and frictionally gripped by said bearings and pivotally connecting the shank section and said plate and thigh section, a knee check lever secured to the shank section and having a hub encircling and secured to the bolt within the knee plate opening, a flat spring convolutely wound about said hub and connected at its inner end to said hub and at its outer end to said plate in position for constantly tending to swing the shank section forwardly with relation to the thigh section, means engageable by the check lever for limiting forward swinging movement of the shank section, and means adjustably mounting the inner end of said spring on said hub for varying the shank swinging force to be exerted by said spring, said last named means comprising a radially inwardly turned inner end extremity on said spring and a plurality of selective receiving slots spaced circumferentially about the knee check hub.

13. In artificial limb structure, the combination of a knee plate shaped to traverse and conform in peripheral outline to the lower end extremity of a thigh section and having an upstanding cylindrical extension adapted to be adjustably secured in a bore in a thigh section, said plate also having a center opening therein and two knee bolt receiving friction bearings flanking said opening, a knee bolt extending through and frictionally gripped by said bearings, a knee check lever having a hub encircling and secured to the bolt within the plate opening, a flat spring convolutely wound about said hub and connected at its inner end to said hub and at its outer end to said plate in position for constantly tending to swing the check lever forwardly with relation to the knee plate, and means for adjustably mounting the inner end of the spring comprising a radially inwardly turned end extremity on the said spring and a plurality of selective receiving slots spaced circumferentially about the knee check hub.

LOUIS H. BARGHAUSEN.

References Cited in the file of this patent

UNITED STATES PATENTS

| Number | Name | Date |
|---|---|---|
| 2,513,134 | Barghausen | June 27, 1950 |
| 2,542,567 | Peters | Feb. 20, 1951 |